(12) United States Patent
McCormack et al.

(10) Patent No.: US 9,413,890 B2
(45) Date of Patent: Aug. 9, 2016

(54) SYSTEMS AND METHODS FOR MONITORING AND PRIORITIZING METRICS WITH DYNAMIC WORK ISSUE REASSIGNMENT

(71) Applicant: Avaya Inc., Basking Ridge, NJ (US)

(72) Inventors: Tony McCormack, Galway (IE); Neil O'Connor, Galway (IE); Paul D'Arcy, Limerick (IE); David McGlynn, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 37 days.

(21) Appl. No.: 14/150,060

(22) Filed: Jan. 8, 2014

(65) Prior Publication Data

US 2015/0195405 A1    Jul. 9, 2015

(51) Int. Cl.
*H04M 3/51* (2006.01)
*G06Q 10/06* (2012.01)

(52) U.S. Cl.
CPC ....... *H04M 3/5175* (2013.01); *G06Q 10/06393* (2013.01); *G06Q 10/06398* (2013.01)

(58) Field of Classification Search
CPC .................. G06Q 10/06393; G06Q 10/06398
See application file for complete search history.

(56) References Cited

U.S. PATENT DOCUMENTS

| | | | | |
|---|---|---|---|---|
| 7,367,808 | B1 * | 5/2008 | Frank | G06Q 10/06 434/219 |
| 8,396,205 | B1 * | 3/2013 | Lowry et al. | 379/265.12 |
| 2010/0274620 | A1 * | 10/2010 | Upadhyaya | G06Q 10/06 705/7.15 |
| 2013/0282447 | A1 * | 10/2013 | Himanen et al. | 705/7.42 |
| 2014/0095268 | A1 * | 4/2014 | O'Connor et al. | 705/7.39 |
| 2014/0181676 | A1 * | 6/2014 | Samborskyy et al. | 715/736 |
| 2014/0362984 | A1 * | 12/2014 | Danson et al. | 379/265.06 |
| 2015/0098560 | A1 * | 4/2015 | McCormack et al. | 379/265.06 |

* cited by examiner

*Primary Examiner* — Harry S Hong

(57) ABSTRACT

A metrics optimization system for managing key performance indicators (KPIs) of a contact center is disclosed. The metrics optimization system includes a monitoring module configured to monitor the KPIs of agents and work items. The metrics optimization system further includes a ranking module configured to rank the monitored KPIs based on predefined rules. The metrics optimization system further includes a display module configured to display the KPIs to a first supervisor from a plurality of supervisors based on the ranks of the monitored KPIs. The metrics optimization system further includes an analysis module configured to analyze performance of the first supervisor to improve the displayed KPIs. The metrics optimization system further includes an assign module configured to assign the displayed KPIs to a second supervisor based on the performance of the first supervisor.

20 Claims, 5 Drawing Sheets

SYSTEMS AND METHODS FOR MONITORING AND PRIORITIZING METRICS WITH DYNAMIC WORK ISSUE REASSIGNMENT

BACKGROUND

1. Field of the Invention

Embodiments of the present invention generally relate to a system and method for managing metrics/Key Performance Indicators (KPIs) and particularly to a system and method for displaying prioritized metrics/KPIs to a first supervisor and dynamically allocating the KPIs to another supervisor based on performance of the first supervisor.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day Automatic Call Distributions (ACDs) when the ACD system's controller detects that an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways that are service level and match rate.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out etc.). Of course, service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements (SLAs). Operational efficiency is achieved when the KPIs are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers that can increase the service level agreement of the contact center.

Typically in contact center environments, supervisors and managers are required to monitor and manage metrics and key performance indicators of the contact center. The supervisors are employed with a group of agents typically in the ratio of 10 to 20 agents. The number of agents employed to the supervisor is less because a single supervisor cannot handle the responsibilities of management with a large number of agents. Further, there is a high risk that a supervisor having too many agents would be overwhelmed with the metrics/KPIs that need to be managed in the contact center. Further, in case if workload of the supervisor is increased, then it is difficult for the supervisor to manage the workload and also to maintain the metrics/KPIs of the contact center.

There is thus a need for a system and method to manage the metrics/KPIs of the contact center.

SUMMARY

Embodiments in accordance with the present invention provide a metrics optimization system for managing key performance indicators (KPIs) of a contact center. The metrics optimization system includes a monitoring module configured to monitor the KPIs of agents and work items. The metrics optimization system further includes a ranking module configured to rank the monitored KPIs based on predefined rules. The metrics optimization system further includes a display module configured to display the KPIs to a first supervisor from a plurality of supervisors based on the ranks of the monitored KPIs. The metrics optimization system further includes an analysis module configured to analyze performance of the first supervisor to improve the displayed KPIs. The metrics optimization system further includes an assign module configured to assign the displayed KPIs to a second supervisor based on the performance of the first supervisor.

Embodiments in accordance with the present invention further provide a computer-implemented method for managing key performance indicators (KPIs) of a contact center. The computer-implemented method includes monitoring the KPIs of agents and work items, ranking the monitored KPIs based on predefined rules, displaying the KPIs to a first supervisor from a plurality of supervisors based on the ranks of the monitored KPIs, analyzing performance of the first supervisor to improve the displayed KPIs, and assigning the displayed KPIs to a second supervisor based on the performance of the first supervisor.

Embodiments in accordance with the present invention further provide a computer-implemented method for managing key performance indicators (KPIs) of a contact center.

The computer-implemented method includes monitoring the KPIs of agents and work items, calculating a rank for the monitored KPIs based on predefined rules, displaying the KPIs to a first supervisor from a plurality of supervisors based on the ranks of the monitored KPIs, providing a budget to the first supervisor to manage the displayed KPIs, analyzing performance of the first supervisor to improve the displayed KPIs in the provided budget, and assigning the displayed KPIs to a second supervisor based on the performance of the first supervisor.

The present invention can provide a number of advantages depending on its particular configuration. First, the present invention provides a system and method to rank and prioritize the metrics/KPIs having values less than predefined thresholds. Further, the present invention provides a system and method to enforce a supervisor to give attention to certain metrics/KPIs requiring supervisor attention. The present invention assigns another supervisor to manage the metrics/KPIs of the contact center, if the first manager is busy or not able to address the metrics/KPIs. Also, the present invention dynamically reassigns or offloads a number of agents when the supervisor fails to deal with a critical issue within predefined time limits. The present invention provides a system and a method to select an alternate supervisor to get control over the situation. Further, the present invention monitors the capacity/performance of all supervisors in the contact center. Further, the present invention provides dynamic reallocation of resources to an alternative supervisor to manage the metrics/KPIs of the contact center.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
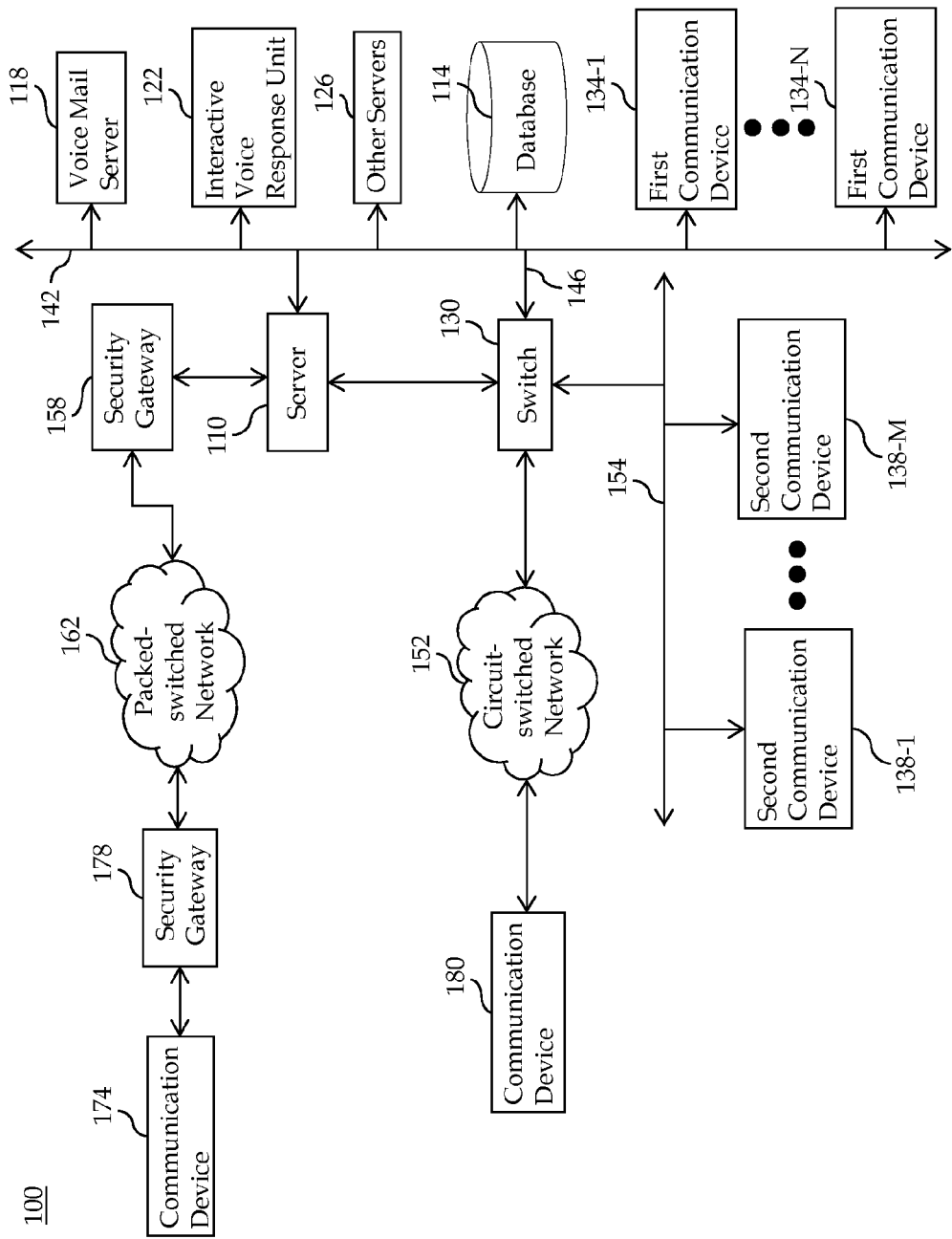
FIG. 1 illustrates a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a central server 110, a set of data stores or database 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and the packet-switched network 162 to process communications passing between the server 110 and the packet-switched network 162.

Although the preferred embodiment is discussed with reference to client-server architecture, it is to be understood that the principles of the present invention apply to other network architectures. For example, the invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

Figure 2:
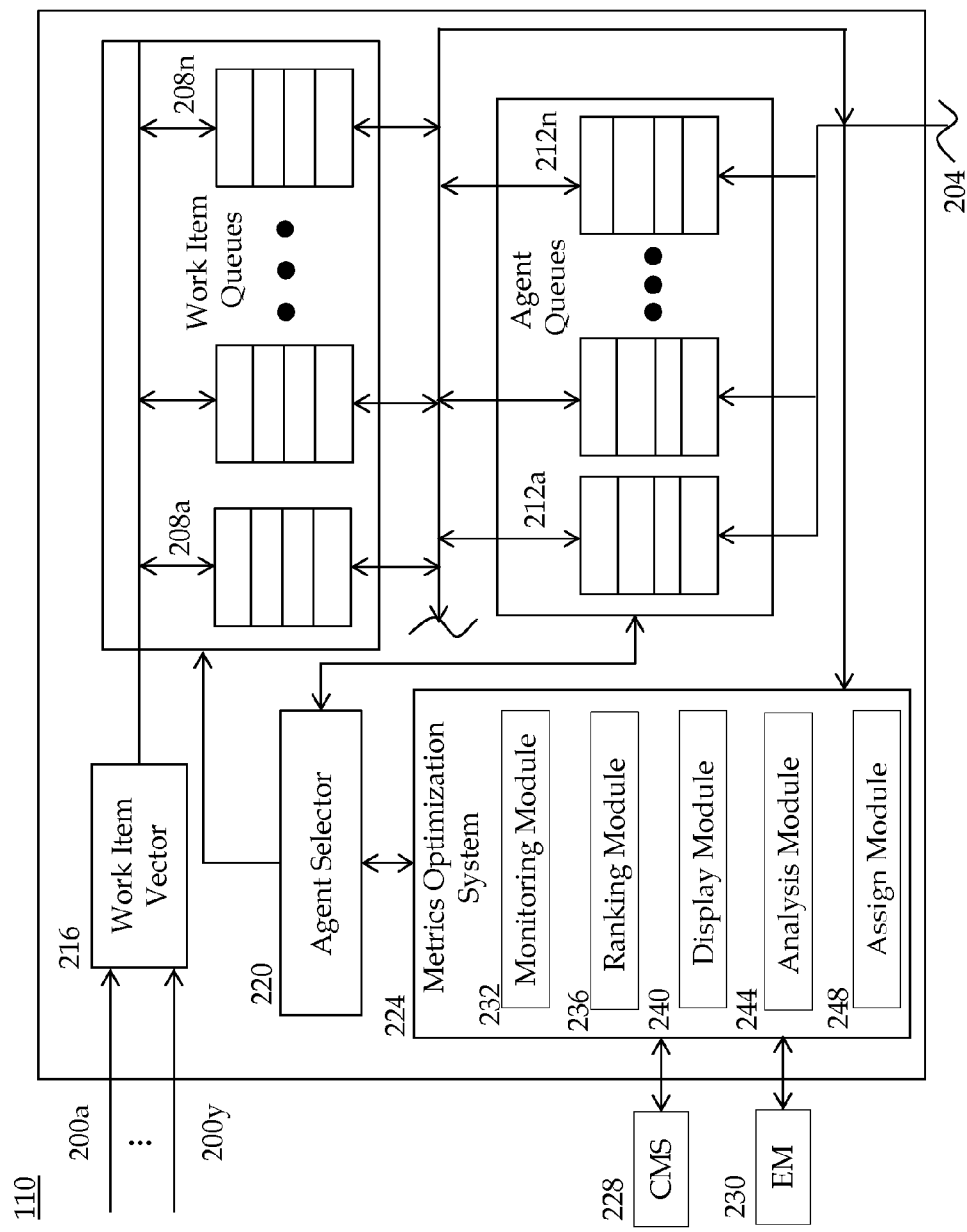
FIG. 2 illustrates a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as the LAN 142 and/or a circuit switched voice line). The server 110 can include Avaya Inc.'s an Operational Analyst™ (OA) with On-Line Analytical Processing (OLAP) technology, or a Call Management System (CMS) 228 that gathers contact records and contact center statistics for use in prioritizing metrics/Key Performance Indicators (KPIs) of the contact center. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

As can be seen in FIG. 2, included among the data stored in the server 110 is a set of contact queues or work item queues 208a-n and a separate set of agent queues 212a-n. Each work item queues 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues that correspond to a different priority. Likewise, each agent's queues are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item vector 216. Contacts incoming to the contact center are assigned by the work item vector 216 to different work item queues 208a-n based upon a number of predetermined criteria, including customer identity, customer needs, contact center needs, current contact center queue lengths, customer value, and the agent skill that is required for the proper handling of the contact. Agents who are available for handling work items are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator, and each of the work item queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the security gateway 158 may be implemented as hardware such as via an adjunct processor (as shown) or as a chip in the server.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices may include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch, or server and first and second communication devices, i.e., the invention may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In a preferred configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1 is for purposes of illustration only and should not be construed as limiting the invention to any particular arrangement of elements.

As will be appreciated, the central server 110 is notified via LAN 142 of an incoming work item by communications component (e.g., switch 130, fax server, email server, Web Server, and/or other servers) receiving the incoming work item as shown in FIG. 1. The incoming work item is held by the receiving telecommunications component until the server 110 forwards instructions to the component to forward or route the contact to a specific contact center resource, such as the IVR unit 122, the voice mail server 118, and/or first or second communication device 134-1-N, 138-1-M associated with a selected agent. The server 110 distributes and connects these work items to telecommunication devices of available agents based on the predetermined criteria noted above. When the server 110 forwards a voice contact (or first work item) to an agent, the server 110 also forwards customer-related information from the database 114 to the agent's computer work station for viewing (such as by a pop-up display) to permit the agent to better serve the customer and to manage the metrics/KPIs (e.g., average revenue, customer satisfaction, service level agreement etc.) of the contact center. Depending on the contact center configuration and current status of the metrics/KPIs, the server 110 may assign another supervisor to manage resources under first supervisor. The resources process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the present invention, included among the programs executing on the server 110 are an agent selector 220 and a metrics optimization system 224. The agent selector 220 and the metrics optimization system 224 are stored either in the main memory or in a peripheral memory (e.g., disk, CD ROM, etc.) or some other computer-readable medium of the contact center 100. The agent selector 220 effects an assignment between available work items (or contacts) and available agents in a way that tends to maximize contact center efficiency for the current contact center state. The agent selector 220 uses predefined criteria in selecting an appropriate agent to service the work item. The metrics optimization system 224, in particular, obtains, for each of a plurality of contact center business goals or objectives, current status information, or information respecting whether or not a corresponding metrics (for example, the service level agreement) is being met or unmet and/or a level to which the corresponding goal is being met or unmet. For example, exemplary metrics can be expressed as actual, average or median wait times in each work item queues $208a\text{-}n$, actual, average, or median agent staffing levels in each agent queue $212a\text{-}n$, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

The agent and their associated data are maintained and updated by the database 114. Upon the completion of handling a work item, the generator collects selected metrics for the work item. These metrics/KPIs include the skill involved in servicing the work items, the identifier of the servicing agent, the contact duration, the transaction or contact type (e.g., sale, information request, complaint, etc.), the time-of-day, the result (e.g., the type of sale, the number of units sold, average revenue generated etc.), a self-rating of the servicing agent respecting the agent's proficiency in handling the work item, the rating of the customer of the agent's proficiency in handling the work item, the rating of another party, such as the agent's supervisor or another observer, of how the work item was serviced, whether the agent requested assistance, and whether the agent's training was completed, and stores the information in the database 114, such as the CMS 228.

The metrics optimization system 224 has access to various details of the incoming calls as well as details of the current status of the metrics/KPIs in the contact center. The metrics optimization system 224 may also monitor and determine metrics/KPIs having operating values less than predefined thresholds. Further, the metrics optimization system 224 may calculate a rank and prioritize the metrics/KPIs based on predefined rules. According to an embodiment, rank may indicate urgency of a supervisor's attention required by the KPIs. Based on the monitored values and predefined rules, the metrics optimization system 224 may display the metrics/KPIs on a first supervisor's dashboard. In an embodiment, the displayed metrics/KPIs belong to agents working in supervision of the first supervisor. If values of the metrics/KPIs are below threshold levels, then the metrics optimization system 224 may provide a "budget" such as, elapsed time frames or number of actions the supervisor may take to handle the incoming work items with the available resources. The metrics optimization system 224 may notify and assign a second supervisor to take over control to manage the metrics/KPIs if the first supervisor is busy in handling other work items or is unable to handle the incoming work items. Further, the metrics optimization system 224 may select the second supervisor having less work items or have skills to manage the metrics/KPIs in crisis (for example, who can convert negative sentiments of the customers into positive outcomes). The metrics optimization system 224 may further monitor performance of the second supervisor, and may again reassign the metrics/KPIs to a third supervisor, if the second supervisor is also busy or unable to manage the metrics/KPIs.

According to an embodiment of the present invention, the metrics optimization system 224 includes a monitoring module 232, a ranking module 236, a display module 240, an analysis module 244, and an assign module 248.

The monitoring module 232 may monitor key data of incoming work items and state events of agents of the contact center that may affect operating values of the metrics/KPIs. The state events of the agents may include ready, not ready, busy, offline etc. In another embodiment of the present invention, the monitoring module 232 may monitor current status of the metrics/KPIs of the contact center. The monitoring module 232 may monitor current status of the metrics/KPIs based on existing routing rules of the contact center. The metrics/KPIs of the contact center may include average revenue, estimated, actual, or predicted wait time, average speed of answer, throughput, agent utilization, agent performance, agent responsiveness and the like, to calculate performance relative to Service Level Agreements (SLAs).

The monitoring module 232 is further configured to monitor details of agents of the contact center. The details of the agents may include agent's skills related to business (e.g., interested and proficient in solving mobile device problems), communication style, call handling time etc. For example, agents having skills in converting incoming work items to successful calls to maintain the contact center efficiency. The contact center efficiency may increase by maintaining the metrics/KPIs of the contact center such as reducing wait time, increasing handling time of the work items etc. The monitored inputs and current status of the metrics/KPIs are then stored as parameters in the database 114.

The ranking module 236 is configured to rank and prioritize the monitored metrics/KPIs based on predefined rules of the contact center. In another embodiment of the present invention, the ranking module 236 is configured to rank and prioritize the metrics/KPIs having values less than predefined thresholds. For example, if operating value of a metrics/KPI (e.g., throughput) is much below a predefined value (more than rest of metrics/KPIs against their thresholds), then the ranking module 236 may rank the metrics/KPI as "rank 1" and may provide highest priority to it.

The display module 240 is configured to display the metrics/KPIs to a first supervisor from multiple supervisors based on the rank of the monitored metrics/KPIs in an embodiment of the present invention. In an embodiment of the present invention, the first supervisor is the supervisor responsible for managing the agents whose metrics/KPIs values have gone below the thresholds. The display module 240 may display the current status of the metrics/KPIs based on the existing routing strategy of the contact center. In an embodiment of the present invention, the display module 240 may display the current status of the metrics/KPIs in the form of graphs, pie charts, histograms etc. In another embodiment of the present invention, the display module 240 is configured to display the performance of the first supervisor to a manager or an administrator of the contact center for an action taken by the first supervisor. The performance of the supervisor may include handling time of work items, number of work items with positive outcomes, waiting time of work items etc.

Further, in an embodiment of the present invention, the display module 240 may generate alerts and display notifications on the supervisor's dashboard about metrics/KPIs having operating values less than predefined thresholds. The display module 240 is configured to display a plurality of alerts comprising beeps, flash, and popup. The alert may notify the supervisor that values of the metrics/KPIs are below a predefined threshold, and to ask the supervisor to take necessary actions.

Further, the analysis module 244 is configured to analyze performance of the first supervisor in improving the displayed metrics/KPIs of the contact center. The performance of the supervisor is analyzed based on the current status of the metrics/KPIs with predefined thresholds. In another embodiment of the present invention, the analysis module 244 is configured to compute a "budget" and provide it to the first supervisor. In an embodiment, the "budget" may include time frames (e.g., elapsed minutes), number of configuration adjustments or actions (e.g., 3 configuration adjustments while allocating resources) the supervisor may take for handling the work items etc. There may be different "budget" provided to the supervisor depending on how severe or complicated the problem is. For example, if an incoming work item is related to a legal obligation then an increased value of the "budget" is provided to the supervisor such as, 10 elapsed minutes for handling the work item. Or in case, if the incoming work item is related to a general query (e.g., car loans), then the "budget" provided to the supervisor may have reduced elapsed time such as, 5 elapsed minutes.

In yet another embodiment of the present invention, the analysis module 244 is configured to analyze performance of the supervisor and his group of agents while handling the incoming work items. In yet another embodiment of the present invention, the analysis module 244 is configured to automatically route the incoming work items to suitable agents based on the displayed metrics/KPIs of the contact center. The routing of the incoming work items is based on the skills of the agents and predefined routing rules. The analysis module 244 is configured to suggest the supervisor about the allocation of the resources based on the displayed metrics/KPIs on the supervisor's dashboard. The analysis module 244 may further ask the supervisor to approve the suggested allocations.

The assign module 248 is configured to notify and assign the displayed metrics/KPIs to an alternate or a second supervisor based on the performance of the first supervisor in an embodiment of the present invention. For example, if the metrics/KPIs of the contact center is continually decreased based on the performance of the supervisor (e.g., managing the resources or the agents), then an alternate supervisor is notified about the decreasing operating values of the metrics/KPIs. The second supervisor is then assigned to take over the control of the metrics/KPIs and corresponding resources. The second supervisor may then manage the incoming work items to improve the operating values of the metrics/KPIs. In another embodiment of the present invention, the assign module 248 is configured to notify an alternate supervisor who may have fewer work items.

In another embodiment of the present invention, the assign module 248 is configured to automatically assign the work items to the resources to improve the operating values of the metrics/KPIs. For example, to reduce waiting time for the incoming work items, more agents are allocated with incoming work items. The incoming work items are being routed by the assign module 248 to the resources based on a predefined routing algorithm. In yet another embodiment of the present invention, the assign module 248 may manage the resources based on the analyzed results. The analyzed results include performance of the supervisor and the resources for handling the work items.

Further, the assign module 248 is configured to dynamically reassign or "offload" a number of agents to the second supervisor in an embodiment of the present invention. For example, if the metrics/KPIs and performance of the supervisor's group is continually going below the predefined thresholds, then a number of agents may be dynamically "offloaded" or transferred to the second supervisor's group of resources.

Figure 3A:
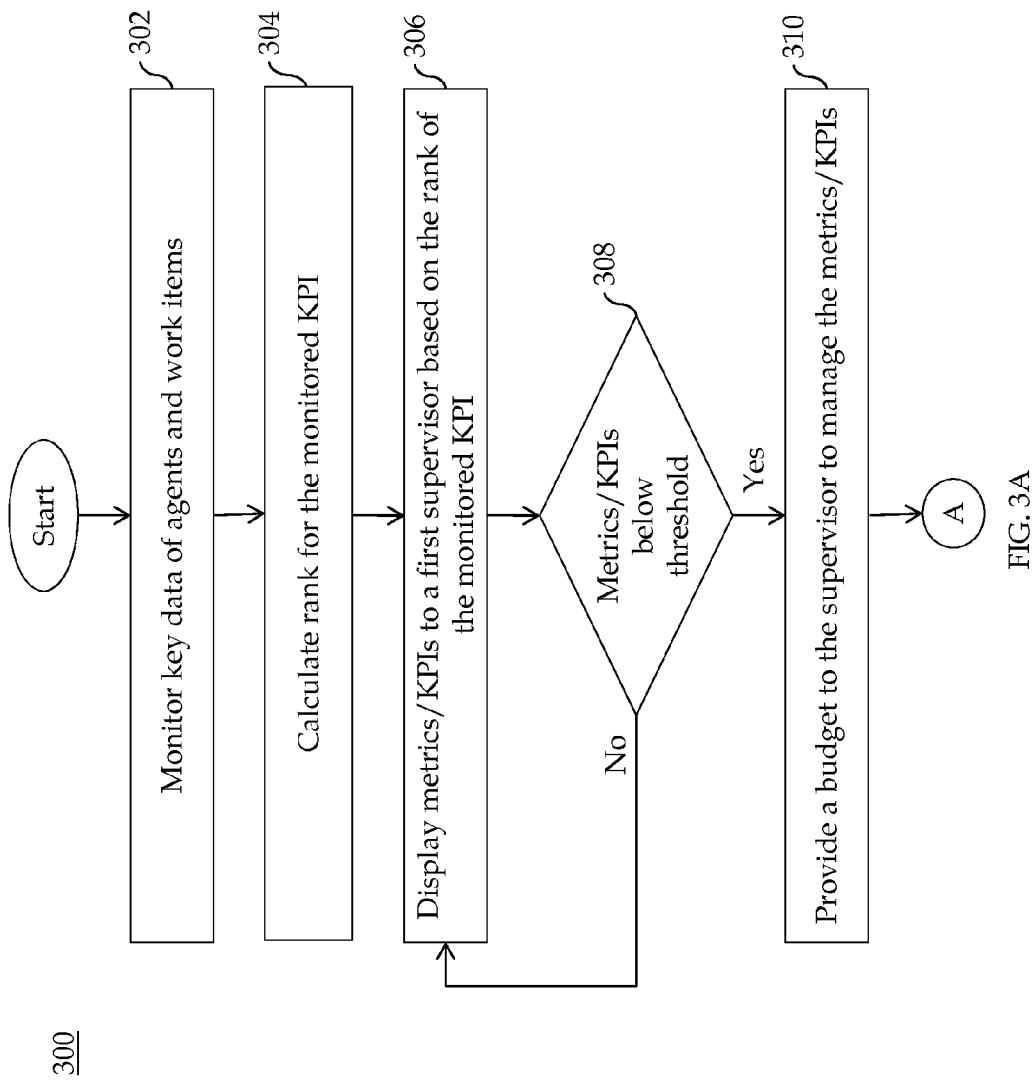
FIGS. 3A and 3B depict a flowchart of a method for managing and prioritizing the metrics/KPI of a contact center when value of a metrics/KPI is below a threshold according to an embodiment of the present invention.
Figure 3B:
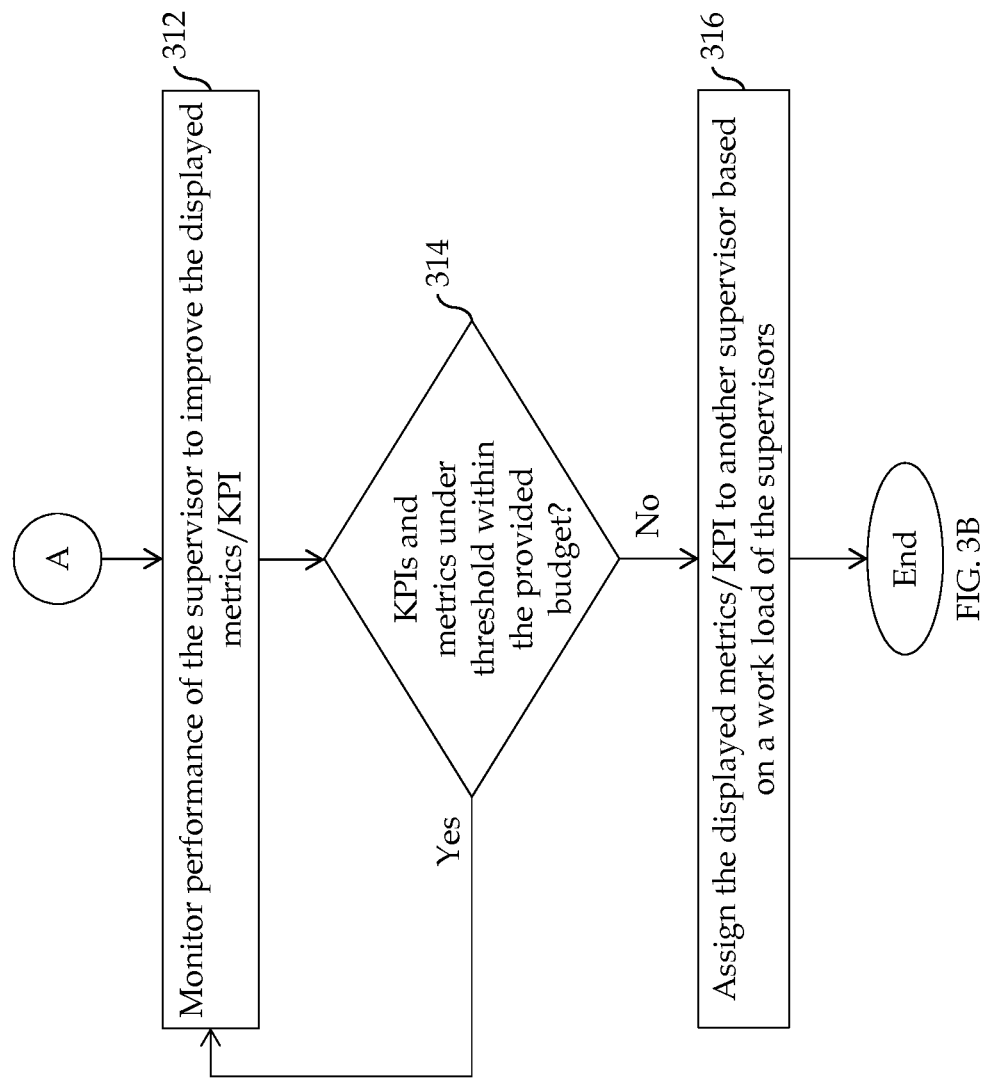

FIGS. 3A and 3B depict a flowchart of a method 300 for managing and prioritizing metrics of a contact center according to an embodiment of the present invention.

At step 302, a metrics optimization system 224 monitors key data of the contact center. The key data of the contact center may include parameters of incoming work items and state events of agents of the contact center that may affect the operating values of the metrics/KPIs. The state events of the agents may include ready, not ready, busy, offline etc. Further, the metrics optimization system 224 may monitor current status of metrics/KPIs of the contact center. The metrics optimization system 224 monitors current status or operating values of the metrics/KPIs based on current routing rules of the contact center. The metrics/KPIs of the contact center may include average revenue, estimated, actual, or predicted wait time, average speed of answer, throughput, agent utilization, agent performance, agent responsiveness and the like, to calculate performance relative to Service Level Agreements (SLAs). Further, the metrics optimization system 224 also monitors details of agents of the contact center. The details of the agents may include agent's skills related to business (e.g., interested and proficient in solving mobile device problems), communication style, call handling time etc.

At step 304, the metrics optimization system 224 calculates rank and then prioritizes the monitored metrics/KPIs based on predefined rules of the contact center in an embodiment of the present invention. In another embodiment of the present invention, the metrics optimization system 224 ranks and prioritizes metrics/KPIs having values less than predefined thresholds. For example, if operating value of a metrics/KPI (e.g., throughput) is below a predefined value, then the metrics optimization system 224 may rank the metrics/KPI as "rank 1" and may provide highest priority to it.

At step 306, the metrics optimization system 224 displays a metrics/KPI of the monitored key data and current status of the metrics/KPIs to a first supervisor based on the rank of the monitored KPI. In an embodiment of the present invention, the metrics optimization system 224 may display the current status of the metrics/KPIs in the form of graphs, pie charts, histograms etc. In another embodiment of the present invention, the metrics optimization system 224 displays performance of the supervisor to a manager or an administrator of the contact center. The performance of the supervisor may include handling time of work items, number of work items with positive outcomes, waiting time of work items etc.

At step 308, the metrics optimization system 224 determines whether any operating value of the displayed metrics is below predefined thresholds. In case, if operating values of the metrics/KPIs are above predefined thresholds then the metrics optimization system 224 may continue to display the metrics/KPIs of the monitored data on the supervisor's dashboard. If the operating value(s) of the metrics/KPI is below predefined thresholds, the method 300 proceeds towards step 310.

At step 310, the metrics optimization system 224 provides a "budget" to the supervisor to manage the metrics/KPI of the contact center. The "budget" includes time frames (e.g., elapsed minutes), number of actions (e.g., 3 configuration adjustments while allocating resources) the supervisor may take to handle incoming work items. In an embodiment of the present invention, there may be different "budget" provided to the supervisor depending on how severe or complicated the problem is. For example, if an incoming work item is related to a legal obligation then an increased value of the "budget" is provided to the supervisor such as, 10 elapsed minutes for handling the work item. Or in case, if the incoming work item is related to a general query (e.g., car loans), then the "budget" provided to the supervisor may have reduced elapsed time such as, 5 elapsed minutes.

At step 312, the metrics optimization system 224 monitors performance of the supervisor and his group of resources to improve the displayed metrics/KPI. The performance of the supervisor includes handling time of work items, number of work items with positive outcomes, waiting time of work items etc. The performance of the supervisor may also include whether the supervisor is capable of maintaining the operating values of the metrics/KPIs below predefined thresholds.

At step 314, the metrics optimization system 224 determines whether the metrics/KPI and various metrics are under threshold within the provided budget. In case, if the supervisor is able to manage the operating values of the metrics/KPIs under threshold within the provided budget, then the method 300 continues to monitor the performance of the supervisor. Otherwise, the method 300 proceeds towards step 314.

At step 316, the metrics optimization system 224 notifies and assigns another supervisor about the decreasing operating values of the metrics/KPIs of the contact center. For example, if the metrics/KPIs of the contact center is continually decreased based on the decreasing performance of the supervisor (e.g., managing the resources or the agents), then a second supervisor is notified about the decreasing operating values of the metrics/KPIs. The second supervisor is then assigned to take over the control of the resources under the first supervisor. The second supervisor may then manage the incoming work items to improve the operating values of the metrics/KPIs.

In another embodiment of the present invention, the metrics optimization system 224 automatically selects and assigns another supervisor to take over the control based on predefined rules and constraints of the contact center. In yet another embodiment of the present invention, the metrics optimization system 224 may select and assign another supervisor based on the workload of the supervisors. For example, the metrics optimization system 224 may select and assign a supervisor who may have fewer work items to be dealing with. In yet another embodiment of the present invention, the metrics optimization system 224 may randomly select a supervisor to take over the control of the incoming work items.

Further, the metrics optimization system 224 dynamically reassigns or "offloads" a number of agents to the second supervisor in an embodiment of the present invention. For example, if performance of the supervisor's group is continually going below predefined thresholds, then a number of agents may be dynamically "offloaded" or transferred to the second supervisor's group of resources. The assigned supervisor may then manage the resources and incoming work items. In an embodiment of the present invention, the metrics optimization system 224 may suggest the supervisor about the allocation of resources and incoming work items. In another embodiment of the present invention, the metrics optimization system 224 may automatically suggest the supervisor to manage the resources and incoming work items by routing the incoming work requests to some specialized skilled agents.

Figure 4:
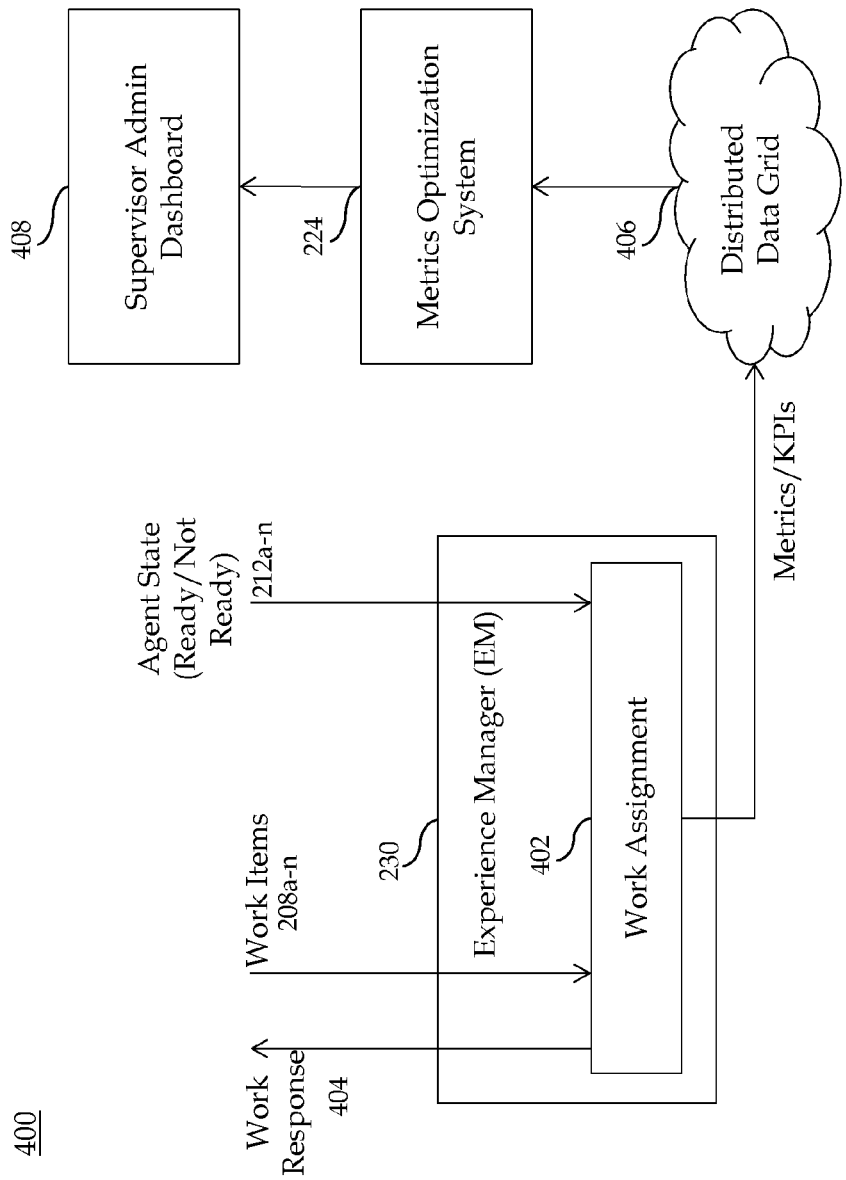
FIG. 4 illustrates a block diagram for managing and prioritizing the metrics/KPIs according to an embodiment of the present invention.

FIG. 4 illustrates a block diagram for ranking and prioritizing metrics according to an embodiment of the present invention. As shown in FIG. 4, an experience manager (EM) 230 includes a work assignment system 402 that receives the work items 208*a-n* and the agent state events 212*a-n* (e.g., ready, not ready, busy etc.). The work assignment system 402 then matches the incoming work items 208*a-n* with available suitably skilled agents. Based on the matching and agent work response 404, a metrics/KPI of the contact center is computed. The computed metrics/KPI of the contact center are then stored in a distributed data grid 406. The stored metrics/KPI of the contact center is then accessed by the metrics optimization system 224 to calculate ranks of the computed metrics/KPI of the contact center. The ranked metrics/KPI of the contact center are then prioritized based on predefined set of rules. The metrics/KPI of the contact center is then displayed to a first supervisor from a plurality of supervisors based on the rank of the monitored metrics/KPI.

Further, performance of the first supervisor is analyzed by comparing current status of the metrics/KPI with predefined thresholds. Also, a "budget" is computed and is provided to the supervisor to handle the incoming work items. The "budget" includes time frames (e.g., elapsed minutes), number of configuration adjustments or actions (e.g., 3 configuration adjustments while allocating resources) the supervisor may take for handling the work items etc. There may be different "budget" provided to the supervisor depending on how severe or complicated the problem is. For example, if an incoming work item is related to a legal obligation then an increased value of the "budget" is provided to the supervisor such as, 10 elapsed minutes for handling the work item. Or in case, if the incoming work item is related to a general query (e.g., home loans), then the "budget" provided to the supervisor may have reduced elapsed time such as, 4 elapsed minutes. Further, a supervisor admin dashboard 408 assigns the displayed KPI to a second supervisor to manage the resources and incoming work items 208*a-n* based on the performance of the first supervisor.

The exemplary systems and methods of this present invention have been described in relation to a user device (e.g. smart device). However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A metrics optimization system for managing key performance indicators (KPIs) of a contact center, the metrics optimization system comprising:
   a processor;
   a memory, coupled to the processor, the memory storing instructions executable by the processor, wherein the instructions when executed by the processor cause the processor to:
   monitor the KPIs of agents and work items;
   rank the monitored KPIs based on predefined rules;
   drive a display of the KPIs to a first supervisor from a plurality of supervisors based on the ranks of the monitored KPIs;
   analyze performance of the first supervisor to improve the displayed KPIs;
   assign the displayed KPIs to a second supervisor; and
   dynamically offload a number of agents to the second supervisor based on the performance of the first supervisor.

2. The metrics optimization system of claim 1, wherein the KPIs includes average revenue, estimated, actual, or predicted wait time, average speed of answer, throughput, agent utilization, agent performance, and agent responsiveness.

3. The metrics optimization system of claim 2, wherein the KPIs further includes current status of operating values of metrics based on existing routing strategy, details of available agents, and incoming work items.

4. The metrics optimization system of claim 1, wherein the instructions when executed by the processor cause the display of the KPIs based on existing routing strategy of the contact center.

5. The metrics optimization system of claim 1, wherein the instructions when executed by the processor cause the processor to rank and prioritize the KPIs having values less than predefined thresholds.

6. The metrics optimization system of claim 1, wherein the instructions when executed by the processor cause the processor to perform analysis to provide a budget to the first supervisor to manage the displayed KPIs of the contact center.

7. The metrics optimization system of claim 6, wherein the budget comprises time frames, and number of contact center configuration adjustments.

8. The metrics optimization system of claim 1, wherein the instructions when executed by the processor cause the processor to drive a display of alerts and notifications about the KPIs having operating values less than predefined thresholds.

9. The metrics optimization system of claim 1, wherein the second supervisor is selected based on a workload of the plurality of supervisors in the contact center.

10. A computer-implemented method for managing key performance indicators (KPIs) of a contact center, the method comprising:
    monitoring, by a processor, the KPIs of agents and work items;
    ranking, by the processor, the monitored KPIs based on predefined rules;
    providing, by the processor, for display to a first supervisor from a plurality of supervisors the KPIs based on the ranks of the monitored KPIs;
    analyzing, by the processor, performance of the first supervisor to improve the displayed KPIs;
    assigning, by the processor, the displayed KPIs to a second supervisor based on the performance of the first supervisor; and
    dynamically offloading, by the processor, a number of agents to the second supervisor based on the performance of the first supervisor.

11. The computer-implemented method of claim 10, wherein the KPIs includes average revenue, estimated, actual, or predicted wait time, average speed of answer, throughput, agent utilization, agent performance, and agent responsiveness.

12. The computer-implemented method of claim 11, wherein the KPIs further includes current status of operating values of the metrics based on existing routing strategy, details of available agents, and incoming work items.

13. The computer-implemented method of claim 10, further comprising ranking and prioritizing the KPIs having values less than predefined thresholds.

14. The computer-implemented method of claim 10, further comprising providing a budget to the first supervisor to manage the KPIs of the contact center.

15. The computer-implemented method of claim 14, wherein the budget comprises time frames, and number of contact center configuration adjustments.

16. The computer-implemented method of claim 10, further comprising generating alerts and notifications, to notify the first supervisor about the KPIs having values less than predefined thresholds.

17. The computer-implemented method of claim 10, wherein the second supervisor is selected based on a workload of the plurality of supervisors in the contact center.

18. A computer-implemented method for managing key performance indicators (KPIs) of a contact center, the method comprising:
    monitoring, by processor, the KPIs of agents and work items;
    calculating, by the processor, a rank for the monitored KPIs based on predefined rules;
    providing, by the processor, for display to a first supervisor from a plurality of supervisors the KPIs based on the ranks of the monitored KPI;
    providing, by the processor, a budget to the first supervisor to manage the displayed KPIs;
    analyzing, by the processor, performance of the first supervisor to improve the displayed KPIs in the provided budget;
    assigning, by the processor, the displayed KPIs to a second supervisor based on the performance of the first supervisor; and
    dynamically offloading, by the processor, a number of agents to the second supervisor based on the performance of the first supervisor.

19. The metrics optimization system of claim 1, wherein the instructions when executed by the processor cause the processor to drive a display of a graphical representation of a current status of the KPIs.

20. The computer-implemented method of claim 10, further comprising providing, by the processor, for display a graphical representation of a current status of the KPIs.

\* \* \* \* \*